(12) United States Patent
Pugliese et al.

(10) Patent No.: US 6,598,722 B2
(45) Date of Patent: Jul. 29, 2003

(54) VENTED INTEGRATED WHEEL END ACTUATOR

(75) Inventors: Scott J. Pugliese, Portland, OR (US); Bryan M. Averill, Portland, OR (US); William Patrick Carpenter, Whitmore Lake, MI (US)

(73) Assignee: Warn Industries, Inc., Milwaukie, OR (US)

( * ) Notice: Subject to any disclaimer, the term of this patent is extended or adjusted under 35 U.S.C. 154(b) by 0 days.

(21) Appl. No.: 09/990,925

(22) Filed: Nov. 16, 2001

(65) Prior Publication Data

US 2003/0094344 A1 May 22, 2003

(51) Int. Cl.⁷ .......................... B60K 23/08; F16D 25/08
(52) U.S. Cl. ................. 192/69.41; 192/69.9; 192/85 V; 192/88 A; 180/247
(58) Field of Search .............................. 192/69.41, 69.9, 192/85 V, 88 A, 91 A; 180/247; 301/105.1; 403/1

(56) References Cited

U.S. PATENT DOCUMENTS

| | | | | |
|---|---|---|---|---|
| 4,282,949 A | * | 8/1981 | Kopich et al. | 180/252 |
| 4,627,512 A | * | 12/1986 | Clohessy | 180/247 |
| 4,817,752 A | * | 4/1989 | Lobo et al. | 180/247 |
| 5,085,304 A | * | 2/1992 | Barroso | 192/69.41 |
| 5,148,901 A | * | 9/1992 | Kurihara et al. | 192/69.41 |
| 5,353,890 A | | 10/1994 | Clohessy | |
| 5,445,258 A | | 8/1995 | Bigley | |
| 5,535,869 A | | 7/1996 | Bigley | |
| 5,740,895 A | | 4/1998 | Bigley | |
| 5,806,623 A | | 9/1998 | Clohessy | |
| 5,984,422 A | * | 11/1999 | Seifert | 301/105.1 |
| 6,109,411 A | | 8/2000 | Bigley | |
| 6,170,628 B1 | | 1/2001 | Bigley | |
| 6,234,289 B1 | | 5/2001 | Baker | |
| 6,422,369 B1 | * | 7/2002 | McCalla | 192/69.41 |

* cited by examiner

*Primary Examiner*—Richard M. Lorence
(74) *Attorney, Agent, or Firm*—Harness, Dickey & Pierce, P.L.C.

(57) ABSTRACT

A shift mechanism for a vehicle wheel wherein a pneumatic annular actuator, through air pressurization and depressurization, produces clutch ring movement to engage and disengage the wheel from the vehicle's drive axle. The components of the wheel end providing an air tight cavity in which the clutch ring is manipulated and which is subjected to air pressure changes. The components include a pneumatic annular actuator, a CV-joint, a rotary seal between the actuator and the CV-joint and a vent passage formed between the air chamber and rotary seal and breaching said air tight cavity. An air line from said passage to non-contaminated ambient air to provide continuous ambient air pressure to said cavity.

3 Claims, 3 Drawing Sheets

VENTED INTEGRATED WHEEL END ACTUATOR

FIELD OF THE INVENTION

This invention relates to a mechanism in the wheel end of a vehicle for shifting the wheel between driven and non-driven states and more particularly it relates to the manner of maintaining the predictability of such shifting.

BACKGROUND OF THE INVENTION

Recent developments in four-wheel to two-wheel drive shift mechanism provides for clutch ring shifting inboard of the vehicle's knuckles at the front end of the vehicle. (See commonly assigned U.S. Pat. Nos. 6,170,628 and 6,234,289) A typical arrangement is one where a pneumatic annular actuator is mounted between the knuckle and the CV-joint. The actuator slidably moves a clutch ring for engagement and disengagement as between the CV-joint and the wheel hub of the vehicle. The actuator by its mounting produces a seal surrounding the inner cavity containing the clutch ring and associated components which are accordingly protected from contamination. The actuator produces actuation by axial movement of a flexible wall forming one side of an annular vacuum chamber. The flexible wall is exposed to the cavity and is connected to the clutch ring for moving the clutch ring and thus producing engagement and disengagement.

The sealing of the cavity provides a valuable function by keeping out dust and moisture that are contaminants that can interfere with the functioning of the shift components. That same seal, because it provides air tight sealing, can be disruptive of the shifting function. The area of the vehicle whereat the cavity resides is subjected to dramatic changes in temperature during normal operation of the vehicle. Elevation differences may also have an affect and even the axial movement of the movable wall which changes the cavity volume produces pressure changes. Whereas the sealing of the cavity is necessary to avoid contamination of the components (clutch ring, fork, bearings, etc.), the pressure changes within the cavity inhibits or enhances the expansion of the air chamber to negatively affect the predictability of the shifting force. An objective of the invention is to provide venting of the cavity to avoid pressure changes within the cavity but without allowing contamination of the cavity.

DESCRIPTION OF THE INVENTION

A solution to the above problem is to provide a special vent including an air line that is open to ambient air at a location where the air is not contaminated. This amounts to providing a passage at some point through the cavity wall, connecting an air line to the passage and extending the air line to a location where there are no contaminants, e.g., in the engine compartment of the vehicle.

As contemplated herein, a rotating CV-joint is located in close adjacency to a rotatively fixed knuckle. The annular actuator is mounted to the knuckle and includes a rotary seal that is in abutting relation with the rotating CV-joint and which prevents passage of air/contaminants between the actuator and the CV-joint. The CV-joint does not lend itself to attachment to a fixed air line and drilling a hole through the knuckle is undesirable for a number of reasons. The annular actuator is essentially an outer fixed ring and an inner expandable ring that form opposing walls of the expandable air chamber. An air line extends through the fixed wall and into the expandable chamber to provide controlled pressurization of the chamber and thus axial movement of the inner wall. A passage cannot be provided through the air chamber and the assembly of the three components (CV joint, knuckle and actuator) does not appear to lend itself to any form of venting.

The present invention nevertheless provides the venting of the cavity through the actuator but without breaching the air chamber. The metal ring forming the outer wall of the actuator is U or cup shaped. An inner elastomeric ring mates to the metal ring and provides the movable wall that expands into the sealed cavity whereat the clutch ring resides. In the prior actuator, a boss was provided integral with the metal ring and a hole or passage was drilled through the boss and through the metal ring and into the chamber. A vacuum tube extended from the hole in the boss to the intake manifold for pressurization of the chamber. The outer side of the ring is provided with the rotary seal that seals against the rotating CV-joint and creates the sealed cavity at the inner side of the actuator. The boss of the present invention is configured to overlap this rotary seal. A second passage or hole is drilled through the boss (and not through the metal ring) to the juncture whereat the rotary seal is attached to the metal ring. An annular groove is formed in the ring at the juncture and intersects the vent passage whereby exterior air can pass through the vent passage and into the groove. At least one slot and preferably several slots extend from the groove inwardly and behind the seal to the sealed cavity. An air line is connected to the passage and extends to a position where contamination is not a problem.

The above invention as briefly described provides an equalizing vent through or around the actuator where there is no apparent way to provide such a vent. The invention and the embodiments encompassing the invention will be more fully appreciated upon reference to the following detailed description and drawings referred to therein.

DETAILED DESCRIPTION OF THE INVENTION

Figure 1A:
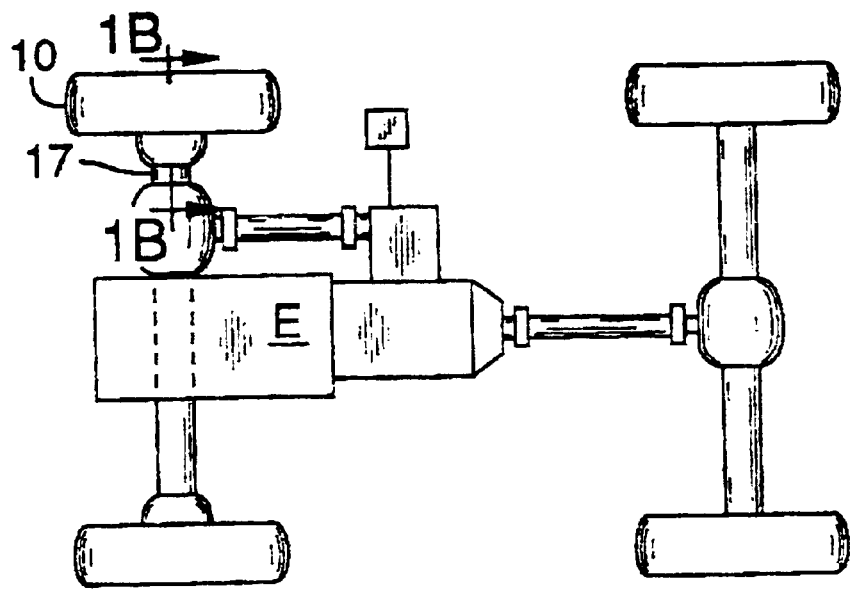
FIGS. 1A and 1B illustrate a vehicle and a wheel end of the vehicle for which the present invention is contemplated
Figure 1B:
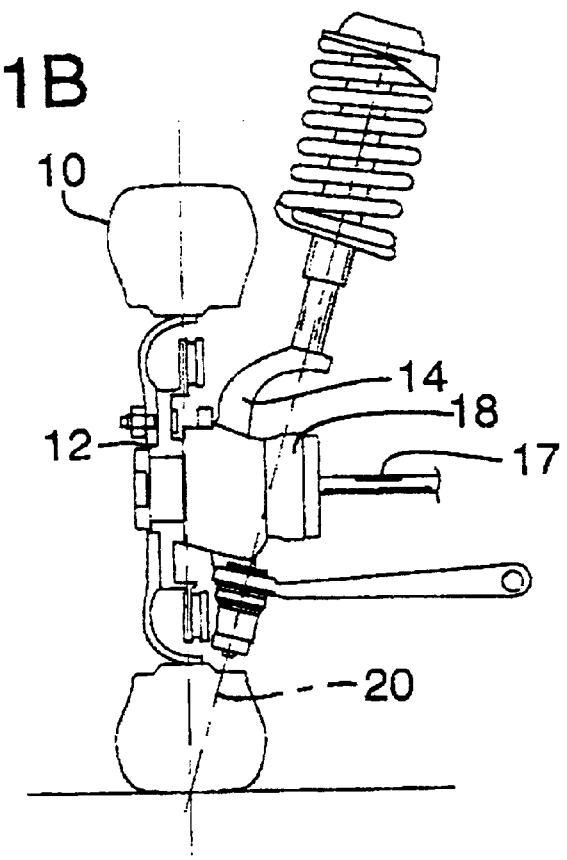

FIG. 1A schematically illustrates a vehicle chassis including front wheels 10 as may incorporate the present invention. FIG. 1B is a partial view as taken on view lines 1B—1B of FIG. 1A and illustrates a front wheel 10 having a hub 12 extended inward where it is supported by a steering knuckle 14. A bearing pack 16 (See FIG. 2) allows rotation of the wheel 10 relative to the steering knuckle 14. As noted in FIG. 1B, a drive axle 17 (of the vehicle drive train) connects to a CV-joint 18 which is secured to the knuckle as will be discussed hereafter. As well known to the industry, the CV-joint is adapted to accommodate the pivotal axis 20 of the wheel 10 and knuckle 14 whereby turning of the front wheel is permitted while remaining in driving engagement with the axle 17.

Figure 2:
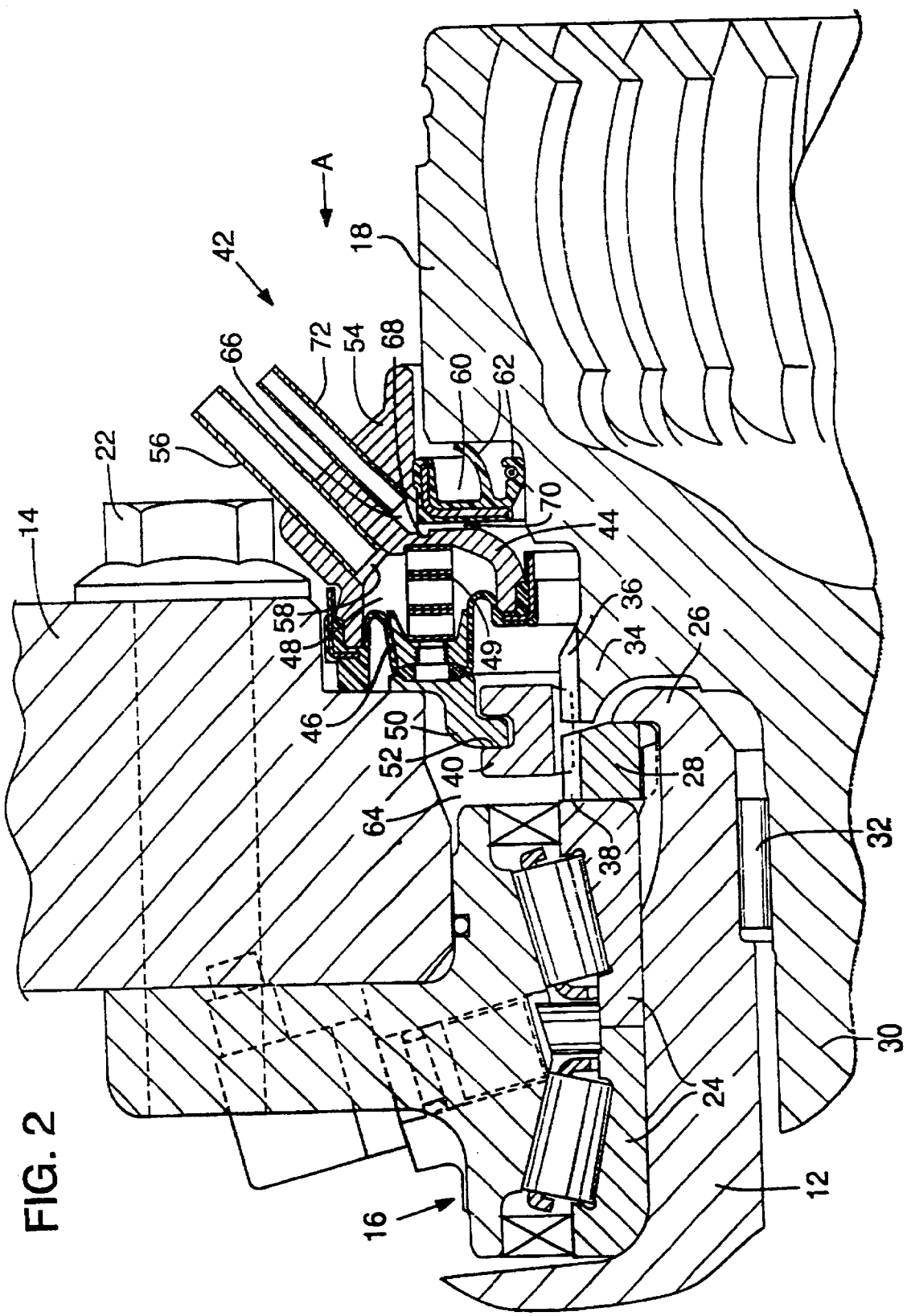
FIG. 2 is an enlarged illustration in cross section of the wheel end and components including an annular actuator designed in accordance with the present invention.

FIG. 2 is an enlarged cross sectional view of the wheel hub 12, knuckle 14 and CV-joint 18. As illustrated, the bearing pack 16 is bolted (bolts 22) to the knuckle and the wheel hub 12 extends through the inner race 24 of bearing pack 16 with the inboard end 26 roll formed to secure a coupler 28 in abutting engagement with the inner race 24 and thereby the wheel hub 12 in engagement with the bearing pack 16 and knuckle 14.

The CV-joint 18 includes an axle portion 30 that is supported by bearing 32 to the inner side of the hub 12. The CV-joint is configured to provide an annular portion 34 having splines 36 that are in mating alignment with splines 38 provided on coupler 28.

It will thus be apparent that the CV-joint is rotatably supported in the hub 12 which is rotatably supported in the knuckle 14.

Figure 3:
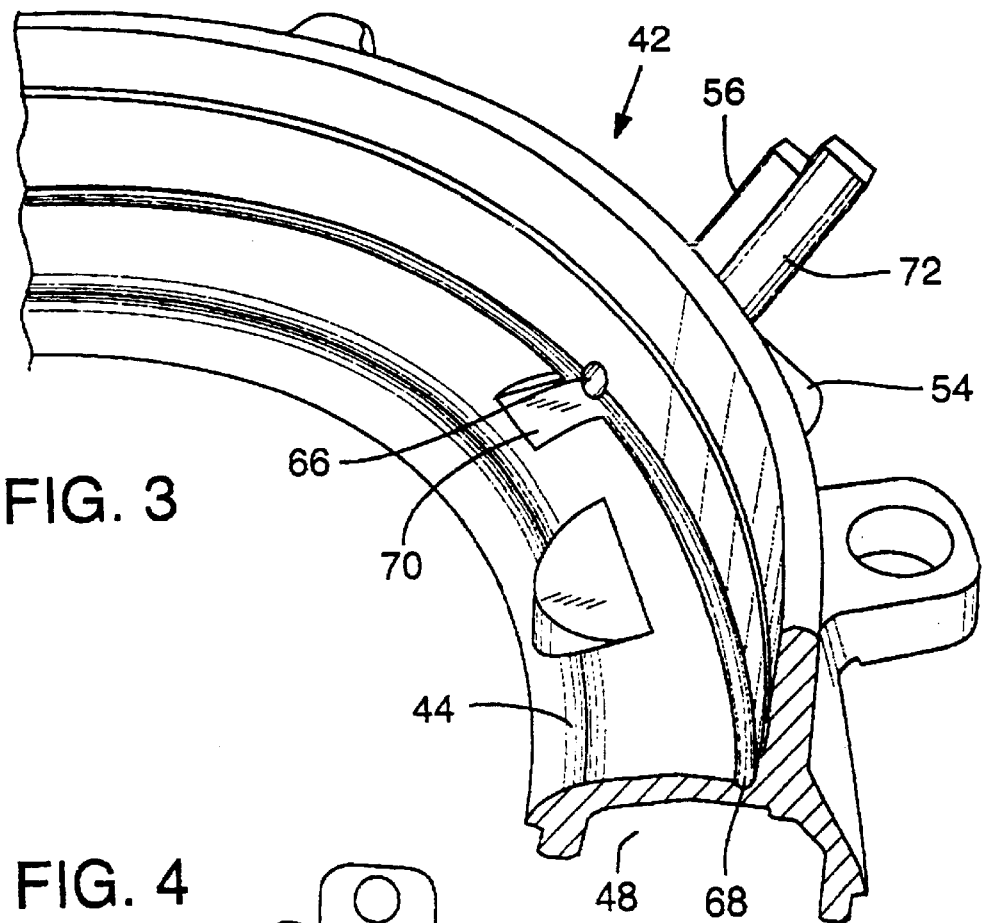
FIG. 3 is a partial perspective view showing a portion of the annular actuator's metal ring.
Figure 4:
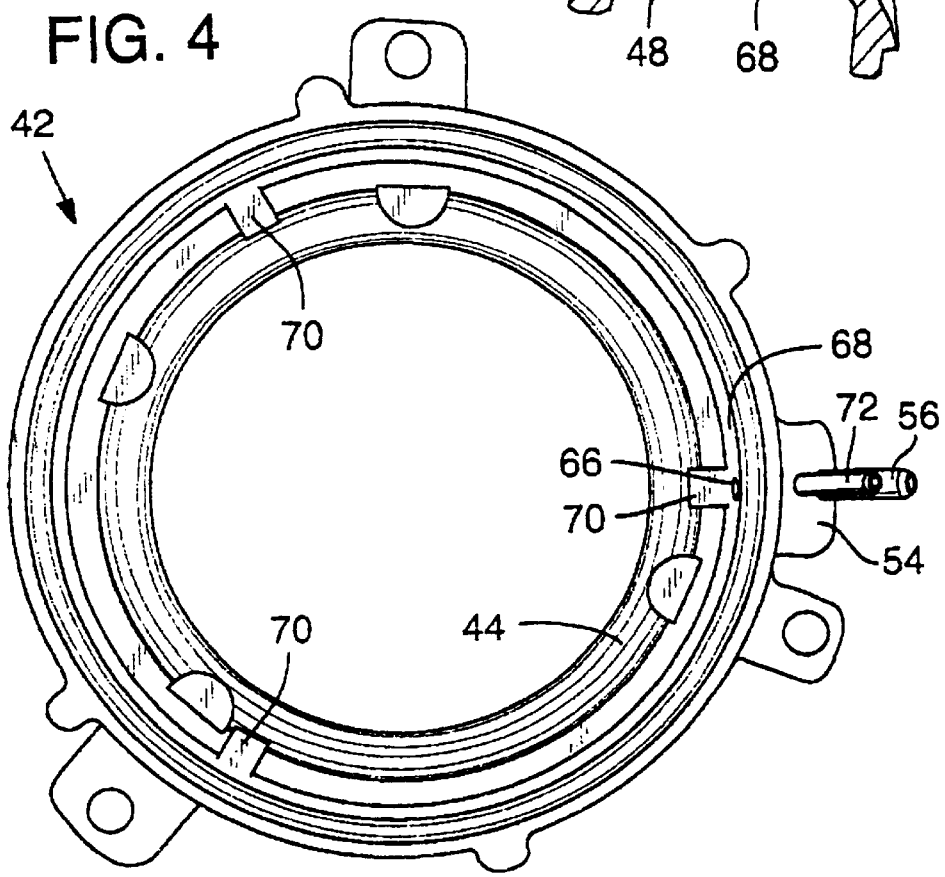
FIG. 4 is a full front view of the metal ring of the annular actuator from the direction of arrow A in FIG. 2 but without the rotary seal.

A clutch ring 40 is shown in engagement with both spline sets 36, 38 of the CV-joint and the coupler 28, respectively. In this relation, the CV-joint (driven by axle 17) drives the wheel hub 12 and accordingly wheel 10. The clutch ring 40 is, however, slidable inwardly from the position of FIG. 2 to disengage from the coupler 28 thereby disengaging wheel 10 from the drive axle. Such sliding movement of the clutch ring 40 is provided by the annular actuator 42 parts of which are shown also in FIGS. 3 and 4.

The actuator 42 includes a metal annular ring 44 and an opposing elastomeric ring 46 which together define an air chamber 48. Secured to the elastomeric ring 46 is positioning fork 50 which is engaged with bearing groove 52 of clutch ring 40. It will be noted that fork 50 does not rotate while the clutch ring does. The arrangement of the fork 50 and clutch ring groove 52 is well known to the industry and accommodates such relative rotation.

Forming a part of the metal ring outer exterior is a boss 54. A passage 58 is provided through the boss and through the metal ring for coupling of air line 56. The air line 56 is connected at its other end to an intake manifold of the vehicle's engine (not shown) to produce a negative air pressure in the chamber 48. When actuated, the negative air pressure draws the fork 50 inwardly relative to chamber 48 and the clutch ring 40 accordingly to cause the clutch ring to disengage from the coupler 28 and thus allow free wheeling of wheel 10. Upon venting of air line 56 to the atmosphere, the air chamber 48 is permitted to expand assisted by a compression spring 49 to return the clutch ring 40 to its engaged position with coupler 28.

As can be seen in FIG. 2, the space or cavity 64 surrounding the clutch ring 40 is sealed off from the surrounding environment. Most notably a rotary seal 60 is carried by the annular actuator 42 and has sealing lips 62 that slidably engage the rotating CV-joint 18 to thereby prevent contaminated air from leaking past the annular ring and into the cavity 64.

As explained in the background of the invention, the cavity 64 as defined by the assembled components including in particular rotary seal 60 is air tight. As this cavity is subjected to pressure variations (due to operating temperatures, elevation and the axial movement of the elastomeric ring 46 which changes the volume in the cavity), the resistance to expansion of chamber 48 varies and this affects the actuating force imparted to the fork 50 and clutch ring 40. This variation is undesirable and is avoided by providing non-contaminated venting of the cavity 64 as illustrated and which will be now explained.

The boss 54 is enlarged sufficiently to accommodate a second passage 66. This passage is strategically formed to avoid penetration through the metal ring 44 and into the chamber 48. It is provided to intersect the juncture between the rotary seal 60 and the metal ring 44. At this intersection, there is a circular groove 68 provided as can also be seen in FIGS. 3 and 4. This groove 68 enables air access through passage 66 to the groove 68 which encircles the outer side of ring 44 and is positioned behind rotary seal 60. A plurality of slots 70 extends from the groove 68 to a position behind and under the rotary seal 60. As will be apparent, this position is within the cavity 64. An air line 72 is connected to passage 66 and is extended (preferably coupled to and in parallel with line 56) to a location where the opposite end of line 72 is open to non-contaminated air.

This invention has solved a perplexing problem of clutch ring actuation by providing a contaminant free environment for clutch ring actuation while avoiding the affect of air pressure variation. Those skilled in the art will likely conceive of variations or modifications to the disclosed embodiment while utilizing the disclosed inventive precepts to achieve the above-described venting. Accordingly, the claims are not to be limited to the above disclosure and are intended to apply broadly to all structures encompassed by a fair and broad interpretation of the terms set forth in the claims.

The invention claimed is:

1. A wheel end of a vehicle comprising:
   a knuckle;
   a wheel and wheel hub rotatably mounted to the knuckle;
   a constant velocity joint positioned adjacent the wheel hub and a clutch ring slidable between positions of interlocked engagement with one of said wheel hub and constant velocity joint and both of said wheel hub and constant velocity joint;
   a pneumatic annular actuator positioned between said knuckle and said constant velocity joint and mounted to said knuckle, and a rotary seal mounted to said actuator and in dynamic sealing engagement with said constant velocity joint and defining an air tight cavity surrounding said clutch ring, said actuator including an air chamber having an elastomeric wall movable upon pressurization and depressurization of said air chamber, said movable wall having an outer side in said air tight cavity and connected to the clutch ring for movement of said clutch ring between said positions as the air chamber is pressurized and depressurized, and an air passage extended into said air chamber and an air line connected to said passage and connected to an air pressure source for directing air into and out of said air chamber;
   a venting passage provided between the actuator and the rotary seal, and an air line connecting said venting passage to non-contaminated ambient air to equalize air pressure in said defined air tight cavity with that of ambient air.

2. A wheel end as defined in claim 1 wherein the annular actuator includes a rigid circular structure defining an outer wall of the actuator, said rotary seal and said outer wall in abutting relation and defining a juncture, a circular groove provided in the outer wall at the juncture, said venting passage intersecting said juncture and providing air passage through said passage into said groove and a slot extended from said groove to bypass the rotary seal.

3. A wheel end as defined in claim 2 wherein a boss forms an enlargement on said outer wall and overlapping said juncture, said air passage and said vent passage projected through the boss, the air passage penetrating through and into the air chamber and the vent passage terminating at a point of intersection of the rotary seal and outer wall and not into the air chamber.

* * * * *